(12) United States Patent
McCarthy

(10) Patent No.: US 8,121,719 B2
(45) Date of Patent: Feb. 21, 2012

(54) METHODS AND APPARATUS FOR ELECTRONICALLY REPRESENTING MANUFACTURING FLOW

(75) Inventor: Gregory McCarthy, Albany, NY (US)

(73) Assignee: GE Fanuc Automation North America, Inc., Charlottesville, VA (US)

( * ) Notice: Subject to any disclaimer, the term of this patent is extended or adjusted under 35 U.S.C. 154(b) by 0 days.

(21) Appl. No.: 11/312,827

(22) Filed: Dec. 20, 2005

(65) Prior Publication Data
US 2007/0142953 A1   Jun. 21, 2007

(51) Int. Cl.
*G06F 19/00* (2011.01)
(52) U.S. Cl. ............................ 700/115; 700/95; 700/101
(58) Field of Classification Search .............. 700/95–97, 700/99–101, 108–110, 115, 222, 225; 702/81–84, 702/182–185; 705/1, 7, 22, 28, 29
See application file for complete search history.

(56) References Cited

U.S. PATENT DOCUMENTS

| | | | |
|---|---|---|---|
| 6,321,133 B1 * | 11/2001 | Smirnov et al. | 700/100 |
| 6,739,512 B2 * | 5/2004 | Guerrero et al. | 235/375 |
| 6,801,821 B2 * | 10/2004 | Madden et al. | 700/115 |
| 6,816,751 B1 * | 11/2004 | Alice et al. | 700/109 |
| 6,850,824 B2 | 2/2005 | Breed | |
| 2001/0056359 A1 * | 12/2001 | Abreu | 705/3 |
| 2003/0033224 A1 * | 2/2003 | Ludwig et al. | 705/28 |
| 2003/0097315 A1 * | 5/2003 | Guerrero et al. | 705/28 |
| 2003/0216969 A1 * | 11/2003 | Bauer et al. | 705/22 |
| 2005/0256788 A1 * | 11/2005 | Mukai | 705/29 |
| 2005/0273369 A1 * | 12/2005 | Ota et al. | 705/4 |
| 2006/0015379 A1 * | 1/2006 | Cogar et al. | 705/7 |
| 2007/0021964 A1 * | 1/2007 | Maenishi et al. | 705/1 |

* cited by examiner

*Primary Examiner* — Charles Kasenge
(74) *Attorney, Agent, or Firm* — Mark A. Conklin, Esq.; Armstrong Teasdale, LLP

(57) ABSTRACT

A method of electronically representing manufacturing flow is provided. The method allows a manufacturer to electronically track an infinite number of attributes related to components used in the production of a finished product. Using these attributes, the manufacturer can perform product recalls based upon information pertinent to a malfunctioning part, rather than a statistical recall. This allows a manufacturer to perform a recall without having to recall substantially more products than necessary.

18 Claims, 3 Drawing Sheets

METHODS AND APPARATUS FOR ELECTRONICALLY REPRESENTING MANUFACTURING FLOW

BACKGROUND OF THE INVENTION

This invention relates to methods and apparatus for electronically representing the flow of a product through a manufacturing process, and specifically, to managing a bill of materials such that a manufacturer can track specific materials used in each end product and control the process steps used to construct the end product.

It is useful for a manufacturer to record information regarding the building of specific products. Specifically, with regard to automobile manufacturers, it is beneficial to know that the specific components in each end product can be tracked if needed. However, given the large number of components that are, or may be, used in the manufacturing process, it is quite difficult to successfully track these components. In addition, the storage of this information allows the manufacturers to review the data when appropriate.

The absence of such accurate data retrieval may lead manufactures to engage in statistical recalls. These recalls are based on recalling products within the manufacturing time windows when it is thought the problem parts or processes were used. This method requires the recalling of many more products than actually necessary, resulting in incremental costs associated with such methodologies.

BRIEF DESCRIPTION OF THE INVENTION

In one aspect, a method for electronically representing manufacturing flow is provided. The method includes receiving an order for a finished product. The order is then divided into subsets indicative of a component for the finished product. Information pertaining to the parts used to build the component is used to develop traceability data which can be used to track the individual parts used in a finished product. The order, traceability data, and data on the finished product are stored within a central database to allow the tracking of individual parts used in several finished products.

In another aspect, a system for electronically representing manufacturing flow is provided. The system includes an order management system which transmits subsets of an order for a finished product, wherein the subsets relate to a component to be used in the finished product. A document delivery system is utilized to build traceability data indicative of the parts used to produce the component. The traceability data is then used by a manufacturing tracker to track the individual parts used in a finished product. The system further includes a central database capable of storing the system's information to facilitate tracking individual parts used in several finished products.

DETAILED DESCRIPTION OF THE INVENTION

Figure 1:
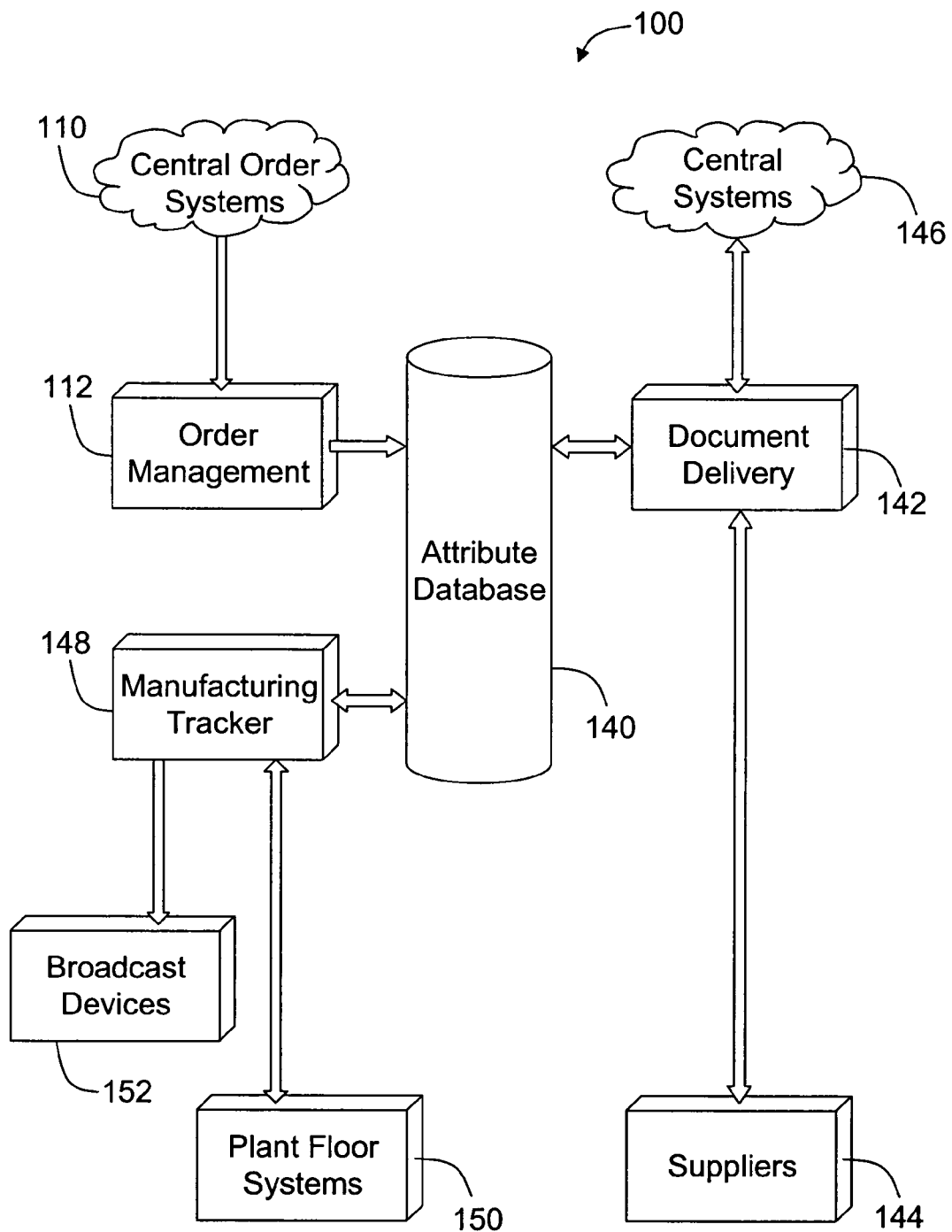
FIG. 1 is a flowchart of an exemplary system for electronically representing manufacturing flow.
Figure 2:
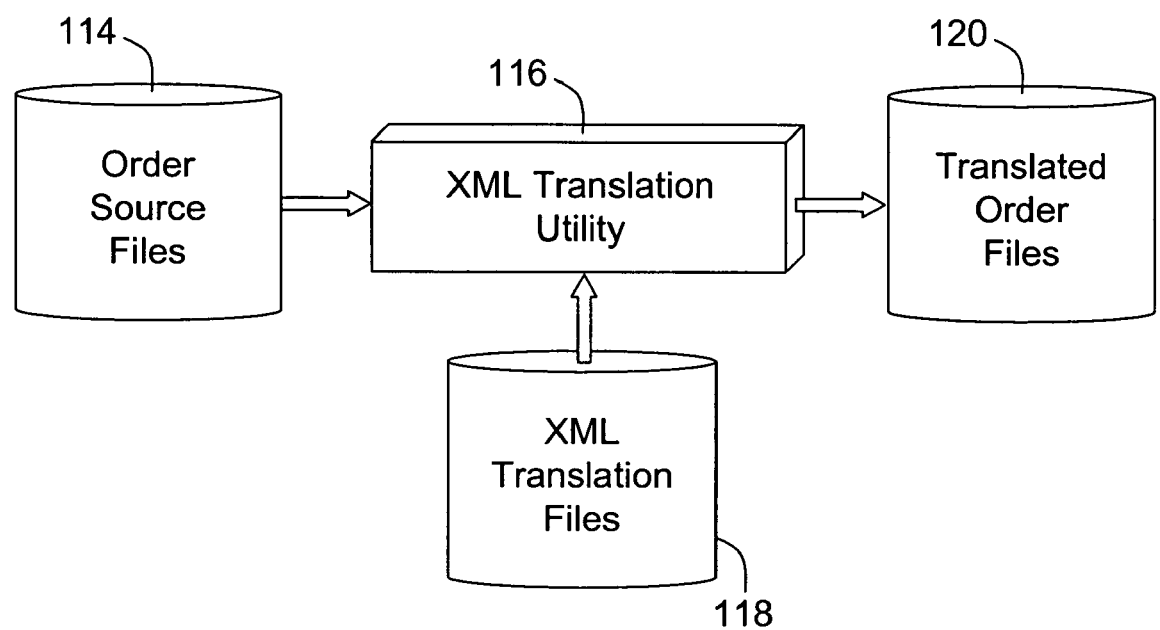
FIG. 2 is a flowchart of an exemplary order management system.

FIG. 1 is a flowchart of an exemplary system for electronically representing manufacturing flow. Specifically, system 100 represents the manufacturing flow for assembly of complex, highly variable end products based on individual bills of material for each end product. System 100 receives an order from a client at a central order system 110. The order is representative of a finished product and is typically received in a text format. The order is transmitted to an order management system 112 which translates the order into an electronic representation compatible with system 100. Referring to FIG. 2, the text format order is placed in an order source file 114. The order is then sent through an XML translation utility 116 where it is converted, using XML translation files 118, into a translated order file 120.

Figure 3:
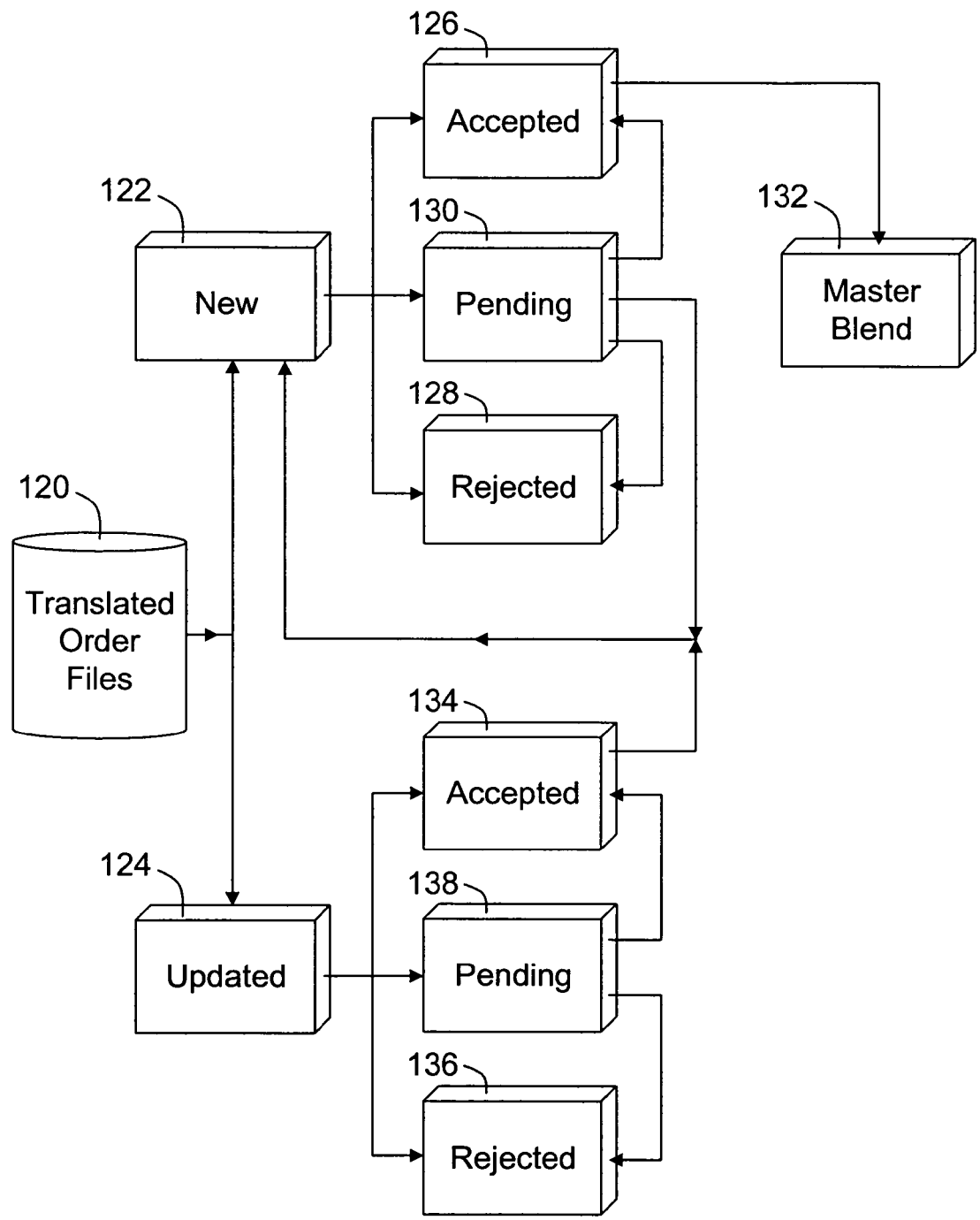
FIG. 3 is a flowchart of an exemplary translation utility.

After the order is translated, it is processed by order management 112 system where it is either accepted or rejected. Referring to FIG. 3 the translated order file 120 is categorized, based on electronically configurable rules, as either a new order 122 or an updated order 124. Based upon the availability of components needed to fill an order and the configured plant production rules the order is either accepted 126, rejected 128, or held as pending 130. Accepted orders 126 are sent to a master blend 132 where all accepted orders are filed, whereas pending orders are reconsidered by the order management system 112 based upon updated information related to component availability and the configured plant production rules.

Updated orders 124 go through a similar logic requiring electronically configurable rules. Based upon the manufacturing status of the original order, updated orders are either considered accepted 134, rejected 136, or held pending 138. If the original order, which is being updated, is at a point of manufacture beyond the capability of being updated, updated order 124 is rejected 136. If there is still time in which the original order can be updated, updated order 124 is accepted 134. Some orders are held pending 138 based upon uncertainty as to whether the order can be updated. Accepted orders 134 are placed within the category of new orders 122, wherein the order is classified based upon the electronically configurable rules discussed hereinabove. Pending orders 138 are reconsidered by the order management system based upon updated information pertaining to the manufacturing status of the original order.

Referring back to FIG. 1, all accepted orders are sent by order management system 112 to an attribute database 140. Attribute database 140 divides the order for a finished product into subsets indicative of particular components utilized in the finished product. The bill of materials for the complete order and the bill of materials for the subsets are stored within attribute database 140 and categorized based upon a potentially infinite number of attributes. The subsets are then transmitted to a document delivery system 142 responsible for notifying suppliers 144 for each individual subset, the quantity of the subset and, if pertinent, the sequence in which the subset is to be produced and delivered to the final assembly plant. For example, if the complete order is for an automobile, one particular subset may be for a stereo system requested for the automobile. Document delivery system 142 informs a supplier 144 who can produce the selected stereo system and the particular sequence in which it should be delivered.

Document delivery system 142 performs two major but similar functions. First, it is responsible for delivering the bill of materials for the subset to the requisite supplier 144, who in-turn produces the component described by the subset. Supplier 144 produces the component and delivers as-built data to document delivery system 142. The as-built data includes information relating to each part used to produce the component. The as-built data is transferred to a central system 140 where this traceability data is stored. The traceability data includes all relevant information required to track parts used in a particular component based upon such attributes as the part's serial number, lot number, discrete and process data, or place of manufacture. The second major function performed by document delivery system 142 is to provide an interface to other computer systems that utilize order, order status, traceability and/or build sequence data. On either a timed, event or request basis, a subset of this information is formatted from attribute database 140 and forwarded to the requesting other computer system.

The traceability data is assembled by suppliers 144 and relayed to document delivery system 142, which sends the traceability data to attribute database 140. Attribute database 140 stores and compiles the traceability data as one of potentially an infinite number of attributes associated with an order for an end product. The traceability data is stored along with the bills of materials for the orders and subsets.

By this time all of the components necessary for the finished product have been shipped to a manufacturing plant where the finished product will be produced. Manufacturing tracker 148 manages the manufacture/assembly of the end product. This management is facilitated by the configuration of an electronic model of the manufacturing facility defining assembly stations, regions (which are contiguous groupings of one or more stations) and the routes between regions. Additionally, manufacturing tracker 148 allows for the definition of rules that determine what route a particular order should take based on the details of the end product order and the current state of the manufacturing facility at the time an order is to be routed from one region to another. It also provides the capability to define rules that are executed each time an end product order enters a particular station. Depending on the end product order details, different actions may be taken at an individual station to facilitate product assembly. An order is initiated in the first station in the first region of the manufacturing model and then moves electronically in parallel with the actual order as it moves from one physical station to the next. An order is removed from the manufacturing tracker model when it exits the last station of the manufacturing process.

Manufacturing tracker 148 interacts with station level operations in one of two ways. In the first type of operation, broadcast devices 152 are used by tracker 148 to transmit build data based on the contents of the order from attribute database 140. This information is presented to assembly workers who then use it to direct the station level operations performed for that order. Broadcast devices 152 are connected in at least one of the following ways: over an Ethernet, via direct connection, or through a serial or parallel terminal server. A graphical editor is utilized to create appropriate forms and data streams to define the data. In addition, the user can preview and test the functionality and output the data to configurable printers. Broadcast devices 152 also include, in one embodiment, a queue manager that enables a user to manage and track broadcast jobs, suspend, resume and cancel broadcast jobs, resend jobs and alarm on error. In the exemplary embodiment, the queue manager is web-enabled.

In the second type of operation, plant floor systems 150 are used by manufacturing tracker 148 to interact with automation present at the station level performing three basic functions. First, it transmits build data based on the contents of the order from attribute database 140 to automation equipment. This information is used by the automation equipment to perform operations within the station. Second, it captures as-build traceability information based on the operations performed at the station. For example, when a particular sub-component part is selected and added to the order, the serial number or lot number of that sub component is captured by manufacturing tracker 148 through plant floor systems 150 and stored in attribute database 140 associated with the order currently in the station. Third, it captures as build process information based on the operations performed at the station. As such, manufacturing tracker 148 compiles information related to which components are placed in a single finished product and produces that information as finished product data. For example, the traceability data of a stereo may indicate that the stereo was produced by supplier A during the production of lot B, using parts C, D, and E. If the finished product is automobile X, the finished product data will indicate that automobile X contains a stereo produced by supplier A during the production of lot B, using parts C, D, and E.

The finished product data is transmitted to attribute database 140, wherein the data is compiled and stored on an order basis containing potentially an infinite number of attributes or component parts. Attribute database 140 is utilized to identify any given component or part used in the manufacture of any given finished product. This allows manufacturers to perform recalls based upon the attributes stored within attribute database 140, rather than performing a statistical recall which often results in recalling more products than necessary.

For example, the finished product may be an automobile and the manufacturer may determine that some stereos placed in the automobiles cause electrical shortages. Rather than performing a statistical recall, the manufacturer can obtain the traceability data of the malfunctioning stereo. The traceability data may indicate that the stereo was produced by supplier A during the production of lot B, using parts C, D, and E. Given this information the manufacturer can search the bills of materials in attribute database 140 to identify every automobile produced with a stereo from supplier A, made during the production of lot B, using parts C, D, and E.

In one embodiment, manufacturing tracker 148 includes a sequence management aspect that is used to perform one or more of the following tasks: manage the flow of items in production, manage the sequence of items in production, manage the use of labor and materials, and reduce costs of production. In an exemplary embodiment, the sequence management aspect is used to optimize the flow of items in production, optimize the sequence of items in production, optimize the use of labor and materials, and minimize costs of production. The sequence management aspect is utilized to reorder and reschedule items based upon production opportunities, constraints, extra work required, and availability of parts. It should be noted that often the sequence and scheduling is adjusted due to a variety of factors often unique in individual areas of the production facility. However, there are also priorities that take precedence over the requirements of individual areas. Some potential priorities include on time delivery, scheduling of shipments, and availability of parts supplied to the production facility. Effective sequence management balances these multiple priorities by establishing weight to the criteria to adjust the production sequence.

The realities of the process also introduce exceptional conditions. Such conditions include failures in process, machinery, equipment, maintenance, labor skill, and quality. These conditions impact the maintenance of efficient sequence management. Dynamic sequence management is utilized to maintain priorities of production as these conditions evolve. Dynamic sequence management adjusts to changing scenarios while maintaining overall priorities and weighting the exceptions to choose correctly.

In addition, dynamic sequence management controls the priority of items within manufacturing tracker 148. Manufacturing tracker 148 includes a model that represents a production environment and includes routes through the production process and places where work is performed. Tracker regions represent the areas where the work is performed, or items reside. Within regions, changes made to items can be captured as attributes. Items represent the tracked orders and bodies within the production environment. Unique aspects of items, either orders or bodies, are placed on the items as attributes and statuses. Attributes of an item that can be evaluated also include time that an item is in a region, time an item was due to be in a region, and the sequence that the item should arrive in. Decisions about what work is to be done at a location can be evaluated based upon attributes. Decisions can also be made by a comparison or evaluation of attributes and/or process conditions to achieve specific production goals.

Sequence management is used to establish a relative priority for the item by moving it ahead, back, or into a similar group, or assigning a priority number, a sequence number, or a rotation number. Such a number is used by decision logic to select the item appropriately. Multiple sequence numbers can often establish different priorities for different areas of production. The actual condition, committed options, or scheduled options of an item are used to quarantine, hold, rework, route and reschedule to meet required production sequence. Often substitution is a valid option to optimize sequence of production. Choosing the oldest order to assign to an available, matching unit is one simple scenario. Often, substitution is a valid option to optimize sequence of production. In addition, choosing the oldest order to assign to an available, matching unit is one simple scenario.

Manufacturing tracker 148 also includes a tracker solve engine that is a high level query engine. The tracker solve engine uses its own syntax to form queries. The engine pulls data from both attribute database 140 and a tracker runtime memory map. The engine is able to name and store Queries for future use, subdivide queries, and abbreviate queries.

In addition, manufacturing tracker 148 includes functionality to conduct pre-planned and coordinated substitution functions using automated logic or manual execution. Configurable product logic supports the analysis of production constraints, desired build sequences, business rules, production time and history, and coordinated and weighted priorities. The analysis conducts coordinated, dynamic substitution at multiple locations encompassing the entire production process. Additionally, multiple substitution scenarios or logic sets can be established which are selectable dynamically to enable the ability to change the entire scenario based upon production requirements. Multiple sites for substitution management can be established and specific, dynamically altered ranges can be applied. All existing product logic configurations are available, and custom logic can be configured using product tools.

The above described method allows a manufacturer to electronically track an infinite number of attributes related to components and parts used in the production of a finished product. Using these attributes, the manufacturer can perform product recalls based upon information pertinent to a malfunctioning part, rather than a statistical recall. This allows a manufacturer to perform a recall without having to recall substantially more products than necessary.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the methods and systems described herein are described in the context of tracking manufacturing data for an automobile, it is understood that the methods described herein are not limited to the manufacture of automobiles. Likewise, the systems illustrated are not limited to the specific embodiments described herein, but rather, components of the system can be utilized independently and separately from other components described herein.

While the invention has been described in terms of various specific embodiments, those skilled in the art will recognize that the invention can be practiced with modification within the spirit and scope of the claims.

What is claimed is:

1. A method for electronically representing manufacturing flow of a finished product within a manufacturer comprising:
   receiving a plurality of orders for the finished product;
   transmitting a subset of an order of the plurality of orders indicative of a component for the finished product;
   building traceability data indicative of parts used to produce the component;
   tracking the parts used in the finished product using the traceability data to facilitate producing finished product data;
   recalling the finished product based on the parts used to produce the component; and
   updating, by a processor, a sequence of production of the finished product by selecting an oldest order of the finished product and assigning the oldest order to an available matching unit.

2. A method for electronically representing manufacturing flow of a finished product within a manufacturer comprising:
   processing, by the manufacturer, a received order for the finished product using electronically configurable rules to facilitate one of accepting and rejecting the order;
   transmitting a subset of the order indicative of a component for the finished product from the manufacturer to a supplier of the component;
   building, by the supplier, traceability data indicative of parts used to produce the component;
   tracking the parts used in the finished product using the traceability data to facilitate producing finished product data, wherein traceability data includes at least one of where the component is manufactured and where the component is assembled, and where the finished product resides;
   storing the order, traceability data, and finished product data in a central database to facilitate tracking the parts used in a plurality of finished products, wherein the central database includes other orders for the finished product and traceability data corresponding to the other orders;
   recalling, by the manufacturer, the finished product based on the parts used to produce the component and at least one of the supplier of the component and a lot number of a lot, wherein the component is produced by the supplier during a production of the lot; and
   updating, by a processor, a sequence of production of the finished product by selecting an oldest order of the finished product and assigning the oldest order to an available matching unit.

3. A method in accordance with claim 2 wherein processing a received order further comprises using electronically configurable rules to facilitate substituting the order for another order.

4. A method in accordance with claim 2 wherein building traceability data further comprises:
   receiving component data from the supplier, the component data indicative of the component as-built; and transmitting the component data to a central system wherein the central system compiles the component data to produce the traceability data.

5. A method in accordance with claim 2 wherein tracking parts further comprises:
   transmitting the traceability data to a plant floor system;
   utilizing the traceability data to generate a plurality of part identifications identifying parts used by the plant floor system to produce the finished product; and
   compiling the part identifications at the plant floor system to produce the finished product data.

6. A method in accordance with claim 2 further comprising managing the order, traceability data, and finished product data by setting parameters within the central database, said parameters indicative of an attribute of the order wherein the order can have infinite attributes.

7. A method in accordance with claim 2 further comprising placing and managing a hold on the order based on malfunction of a part used in a previously finished product.

8. A method in accordance with claim 2 wherein traceability data includes serial numbers, lot numbers, or discrete and process data.

9. A method in accordance with claim 2 wherein the order subset is based on the location of the component to be used in the finished product.

10. A method in accordance with claim 2 wherein said recalling the finished product comprises recalling the finished product based on the parts used to produce the component, the supplier of the component, and the lot number of the lot.

11. A system for electronically representing manufacturing flow comprising:
    an order management system configured to receive, by a processor, a plurality of orders for a finished product, said order management system uses electronically configurable rules to one of accept and reject each of the plurality of orders and transmits a subset of each of the plurality of orders from a manufacturer of said finished product to a supplier of a component for said finished product, said subset of each of the plurality of orders indicative of the component for said finished product each of the plurality of orders is accepted;
    a document delivery system configured to receive said subset of each of the plurality of orders, said document delivery system transmits traceability data to said order management system, said traceability data indicative of a plurality of parts used to produce said component identified in said subset;
    a manufacturing tracker to receive said traceability data and track said parts used to produce said finished product, wherein traceability data includes at least one of where the component is manufactured and where the component is assembled, and where the finished product resides, said manufacturing tracker presents finished product data, wherein the finished product is recalled based on the parts used to produce the component and at least one of the supplier of the component and a lot number of a lot, wherein the component is produced by the supplier during a production of the lot; and
    a central database to store each of the plurality of orders, traceability data, and finished product data to track said parts used in a plurality of finished products;
    wherein said order management system is further configured to update a sequence of production of the finished product by selecting, from the plurality of orders, an oldest order of the finished product and assigning the oldest order to an available matching unit.

12. A system in accordance with claim 11 wherein said order management system further comprises electronically configurable rules to substitute at least one of the plurality of orders for another order.

13. A system in accordance with claim 11 wherein the supplier receives said subsets and produces said component, said supplier produces component data indicative of said component as-built; and
    a central system to produce said traceability data based on said component data.

14. A system in accordance with claim 11 further comprising a broadcast system to broadcast said traceability data to a factory location.

15. A system in accordance with claim 11 further comprising a plant floor system, said traceability data transmitted to said plant floor system to generate a plurality of part identifications identifying said parts used by said plant floor system to produce said finished product, said finished product data based on said part identifications.

16. A system in accordance with claim 11 wherein said central database manages each of the plurality of orders, traceability data, and finished product data by setting parameters indicative of an attribute of each of the plurality of orders, wherein each of the plurality of orders can have infinite attributes.

17. A system in accordance with claim 11 wherein said central database places a hold on said order based on the malfunction of a part used in a previously finished product.

18. A system in accordance with claim 11 wherein said subset is based on the location of said component to be used in said finished product.

* * * * *